(12) United States Patent
Remedios et al.

(10) Patent No.: US 7,783,193 B2
(45) Date of Patent: Aug. 24, 2010

(54) NOISE TONE AVOIDANCE IN OPTICAL NETWORKS

(75) Inventors: Derrick Remedios, Ottawa (CA); James Benson Bacque, Ottawa (CA); Ping Wai Wan, Ottawa (CA)

(73) Assignee: Alcatel Lucent, Paris (FR)

( * ) Notice: Subject to any disclaimer, the term of this patent is extended or adjusted under 35 U.S.C. 154(b) by 545 days.

(21) Appl. No.: 11/754,341

(22) Filed: May 28, 2007

(65) Prior Publication Data

US 2007/0280700 A1   Dec. 6, 2007

(51) Int. Cl.
*H04B 10/08* (2006.01)

(52) U.S. Cl. .............................. 398/32; 398/30; 398/33; 398/15

(58) Field of Classification Search ..................... 398/32
See application file for complete search history.

(56) References Cited

U.S. PATENT DOCUMENTS

| | | | |
|---|---|---|---|
| 6,968,131 B2 | 11/2005 | Obeda et al. | |
| 7,031,606 B2 | 4/2006 | Liu et al. | |
| 7,054,556 B2 | 5/2006 | Wan et al. | |
| 7,127,165 B2 | 10/2006 | Obeda et al. | |
| 7,142,783 B2 | 11/2006 | Obeda et al. | |
| 7,184,660 B2 | 2/2007 | Liu et al. | |
| 2001/0040525 A1* | 11/2001 | Springer et al. ............. 342/195 |
| 2003/0067646 A1 | 4/2003 | Wan | |
| 2003/0099010 A1 | 5/2003 | Liu | |
| 2003/0204595 A1* | 10/2003 | Lev et al. ..................... 709/226 |
| 2004/0062549 A1* | 4/2004 | Obeda et al. .................. 398/30 |
| 2004/0109685 A1* | 6/2004 | Wan et al. ..................... 398/41 |
| 2004/0156643 A1* | 8/2004 | Frederiksen et al. ......... 398/192 |
| 2004/0196534 A1 | 10/2004 | Obeda et al. | |
| 2007/0147520 A1* | 6/2007 | Li et al. ..................... 375/260 |

FOREIGN PATENT DOCUMENTS

EP    785645 A1 *  7/1997

OTHER PUBLICATIONS

Fred Heismann, "Signal Tracking and Performance Monitoring in Multi Wavelength Optical Network", 22nd European Conference on Optical Communication—ECOC'96, Oslo, vol. 3, 15 (Sep. 15, 1996) pp. 47-50.

* cited by examiner

*Primary Examiner*—Ken N Vanderpuye
*Assistant Examiner*—Oommen Jacob
(74) *Attorney, Agent, or Firm*—Victoria Donnelly; IP-Mex Inc.

(57) ABSTRACT

Identification of optical channels in wavelength division multiplex (WDM) optical networks may be confounded by unwanted noise tones interfering with pilot/dither tones used for identifying optical channels. The invention describes a method of selecting pilot/dither tones that are selectively restricted to avoid allocating dither/pilot tone frequencies that appear as noise tones along the path of an optical channel in the optical network.

30 Claims, 5 Drawing Sheets

NOISE TONE AVOIDANCE IN OPTICAL NETWORKS

FIELD OF THE INVENTION

The present invention relates to optical networks, and in particular, to noise tone avoidance in optical networks where pilot/dither tones are used for identifying optical signals.

BACKGROUND OF THE INVENTION

One of the existing techniques of identifying optical channels in an optical network is modulating each optical channel with a respective low frequency pilot tone, or dither tone, or a combination of dither/pilot tones, which uniquely identify the optical channel in the optical network. Such unique combinations of dither tones have been referred to as a channel signature or identification tag in an optical network. The channel signature is detected at various points within an optical network using signal processing methods that extract the low frequency dither tones from the background payload noise.

Methods and apparatus for inserting and detecting such dither tones, selecting their frequencies, and application in an optical network for identifying optical channels are described in the following patents issued to the applicant, all of which are incorporated herein by reference:

U.S. Pat. No. 6,968,131 "Topology discovery in optical WDM networks";

U.S. Pat. No. 7,031,606 "Method and system for monitoring performance of optical network";

U.S. Pat. No. 7,054,556 "Channel identification in communications networks";

U.S. Pat. No. 7,127,165 "Method and system for compensating for side effects of cross gain modulation in amplified optical networks";

U.S. Pat. No. 7,142,783 "Method and system for identification of channels in an optical network"; and U.S. Pat. No. 7,184,660 "Method and system for monitoring performance of optical network", which is a Continuation-in-Part of the U.S. Pat. No. 7,031,606.

Each optical channel is used to transmit a data stream with a given protocol, e.g. SONET, Fiber Channel, Gigabit Ethernet (GbE). The power spectrum of each optical channel data stream includes random and deterministic components, resulting in a payload spectrum that is a combination of random noise, together with fixed line components. For example, the spectrum of a SONET payload will include a random component from the scrambled payload, and a line component at multiples of 8 kHz from the repetitive SONET framing bytes. The payload spectrum (both random and line) appears as noise to the low frequency dither tone detection system. In addition, other sources of interference (for instance, power supply, or on-board clocks coupled into the detection circuit) also degrade the ability of the detection system to correctly decode the low frequency dither information. All these interference sources are collectively referred to as "noise" to the low frequency dither signal.

FIG. 1 illustrates a typical payload data spectrum 10 showing spectral density over a frequency range of about 10 kHz to 1 MHz: a random noise floor 12, a low frequency dither tone (pilot tone) 14, and some "noise" tones 16 in an optical channel of an optical network.

The purpose of the low frequency dither tone 14 may be to identify the optical channel in the network (as well as other physical network properties such as fiber identification etc.) by detecting the tone at various locations in the network, as described for example in U.S. Pat. No. 7,184,660 referenced herein.

The amplitude of the low frequency dither tone 14 is generally designed to be higher than the random noise floor 12, to be detected for example by averaging of FFT results as described in U.S. Pat. No. 7,054,556 referenced herein.

However, the presence of the "noise" tones 16 in the spectrum makes correct identification of the low frequency dither tone 14 (which in this example is an intended identification tag) more difficult, because the "noise" tones 16 could also be detected and interpreted as identification tags.

U.S. Pat. No. 7,127,165 referenced herein, for example, describes a method of rejecting noise tones resulting from cross gain modulation by dynamic thresholding of detected tones in order to separate the actual valid tones of the expected channels from the unwanted signals.

The problem of noise tones is illustrated in more detail in FIG. 2.

FIG. 2 illustrates a scenario 20 of a section of an optical network, including two optical add-drop multiplexers OADM1 and OADM2, joined by a multi-wavelength optical fiber 22. At the OADM1, a first optical channel 24 is generated at a wavelength of λ1 and modulated (encoded) in an optical modulator 26 with a first low frequency dither tone (pilot tone) 28 at a frequency of f1. A first spectrum 30 illustrates the spectral density found on the first optical channel 24 that includes a noise floor and the first pilot tone 28 at frequency f1 carried by the wavelength λ1.

The OADM1 further receives from another part of the optical network a second optical channel 32 at a wavelength λ2, which carries and is identified by a second low frequency dither tone (pilot tone) 34 at a frequency of f2. A second spectrum 36 illustrates the spectral density found on the second optical channel 32 that includes a noise floor and the second pilot tone 34 at frequency f2 carried by the wavelength λ2. In the present example, the wavelength λ2 also carries a noise tone 38 that happens to have a frequency of f1, as shown in the second spectrum 36.

The two optical channels 24 and 32 at the wavelengths λ1 and λ2 respectively, and carrying the first and second pilot tones 28 and 34 (f1 and f2) respectively, as well as the noise, are combined in the OADM1 to be sent to the OADM2 over the multi-wavelength optical fiber 22. A third spectrum 40 illustrates symbolically the spectral density that would be found on the multi-wavelength optical fiber 22, that is the superposition of the first and second spectra 30 and 36. The noise tone 38 and the first pilot tone 28 would be indistinguishable: the noise tone 38 carried by λ2 (the second optical channel 32) "hits" the first pilot tone 28 at the frequency f1.

A problem that could result from the hit of the first pilot tone 28 by the noise tone 38 is the following: the detection of the pilot tones at various locations in the network is used to maintain the network and, for example, detect the failure or misrouting of optical channels. At the OADM2 in FIG. 2, a pilot tone at the frequency f1 could be detected, even if the first optical channel 24 (carrying its pilot tone 28 at frequency f1) should fail—the noise tone 38, also at the frequency f1 could be mistaken for the first pilot tone 28, and the first optical channel 24 would appear to be working and received at the OADM2, when in fact it had failed. Even when the first optical channel 24 is working (carrying its pilot tone 28 at the frequency f1), the 'hitting' of the pilot tone 28 by the noise tone 38 will result in constructive and destructive interference on the tone at f1. Hence detection of the pilot tone 28 becomes erratic.

While the scenario described in FIG. 2 is simplified, it will be appreciated that a real optical network may comprise many nodes and optical (wavelength) channels, each optical channel carrying two or more low frequency dither tones, as described in the U.S. patents referenced earlier, and a considerable number of "noise" tones may occur. In such networks, noise tones which are "ghost" tones may be produced by the cross gain modulation of dither tones as described in U.S. Pat. No. 7,127,165.

While noise tones may originate inadvertently as a result of the payload modulation of an optical channel or as "ghost" tones, another source of "noise" tones may be pilot tones intentionally modulated onto an optical channel by external equipment that is connected to the network. This is illustrated in FIG. 3.

FIG. 3 shows an example of a network hierarchy 50. The network hierarchy 50 comprises an optical carrier network 52 with an optical subscriber managed sub-network 54 connected to the optical carrier network 52 through an input optical link 56 and an output optical link 58.

The optical carrier network comprises first and second optical add-drop multiplexers (OADM) 60 and 62, linked by a multi-wavelength link 64. The optical carrier network 52 may include a number of nodes such as OADMs or other optical nodes, linked in a predetermined configuration through optical links which, in general, are multi-wavelength or wavelength-division-multiplexed (WDM) links. The optical carrier network 52 illustrated in FIG. 3 is simplified and shows only the two OADM nodes 60 and 62, and a subset of its links, in order to more clearly illustrate the problem. Each WDM link transmits signals at one or more wavelengths, commonly referred to as optical wavelength channels (or simply "channels"), while an OADM is able to separate the channels carried in a link, and to combine channels into links as set up by the network control system.

In the example shown in FIG. 3, only two channels, a $\lambda 1$ channel and a $\lambda 2$ channel, are shown even though it will be appreciated that in general, a network comprises many channels, and each OADM routes such channels.

The first OADM 60 receives the $\lambda 2$ channel over a link 66 and the $\lambda 1$ channel over the input optical link 56 from the subscriber network 54. The first OADM 60 then passes both the $\lambda 1$ and $\lambda 2$ channels to the second OADM 62 over the multi-wavelength link 64.

The second OADM 62, having received both the $\lambda 1$ and $\lambda 2$ channels over the multi-wavelength link 64, demultiplexes the channels and sends the $\lambda 2$ channel out to another node (not shown) over a link 68, and the $\lambda 1$ channel over the output optical link 58 to the subscriber network 54.

As described before with regard to FIG. 2, the $\lambda 2$ channel is tagged with a pilot tone of a frequency f2 as schematically shown in a stylized spectrum 70. Similarly, the $\lambda 1$ channel is tagged within the optical carrier network 52 with a pilot tone of a frequency f1 as shown in a stylized spectrum 72. However, the $\lambda 1$ channel arriving in the input optical link 56 may already be tagged with a dither tone of a frequency fx in the sub-network 54 as shown in a stylized spectrum 74. Clearly there is a potential for conflicting or overlapping dither tone assignments, and the dither tone at the frequency fx may be considered to be a "noise" tone within the optical carrier network 52. As shown in a stylized spectrum 76, all three dither tones (f1, f2, and fx) may be observed in the multi-wavelength link 64. After demultiplexing in the OADM 62, the $\lambda 2$ channel may be passed to another node (not shown) in the WDM link 68, and the $\lambda 1$ channel is transmitted to the sub-network 54 in the output optical link 58. The $\lambda 1$ channel still carries the f1 and fx dither tones as schematically shown in a stylized spectrum 78. The presence of fx in the $\lambda 1$ channel may be of importance within the sub-network 54 for confirming the continuity of the $\lambda 1$ channel.

As illustrated in the foregoing, dither tones are of importance for identifying wavelength channels, but the presence of "noise" tones may hide or degrade the dither tones and interfere with their performance. Accordingly, an improved method and system for dealing with noise tones is required to alleviate these problems.

SUMMARY OF THE INVENTION

Accordingly, there is an object of the present invention to provide an improved method and system for identifying optical signals in an optical network, and for providing corresponding selection of dither tones frequencies for identifying the optical signals.

According to one aspect of the invention there is provided a method for identifying an optical signal in an optical network, comprising the steps of:

inserting an identification tag at an encoding location in the optical network by modulating the optical signal with at least one tone frequency selected from a range of frequencies;

detecting noise tone frequencies within the range of frequencies downstream from the encoding location at one or more decoding locations along a path of the optical signal in the optical network;

combining the detected noise tone frequencies from each decoding location to generate a noise tone information object; and removing the frequencies indicated in the noise tone information object from the range of frequencies available for selection at the encoding location.

The step of combining comprises generating the noise tone information object in a form of noise tone presence table; and the step of detecting comprises:

monitoring a frequency spectrum within the range of frequencies, comprising performing a spectrum analysis operation including a discrete transform operation;

determining noise tone frequencies whose amplitude is above a predetermined threshold level; and forwarding a list of the noise tone frequencies to a network manager for processing.

Preferably, the step of performing comprises performing a Fast Fourier Transform (FFT) operation, and the step of monitoring comprises monitoring the frequency spectrum periodically.

In the embodiment of the invention, the step of inserting comprises selecting the range of frequencies from about 10 kHz to about 1 MHz.

According to another aspect of the invention there is provided a method for selecting tone frequencies for identifying an optical signal in an optical network, the method comprising the steps of:

(a) detecting noise tone frequencies at one or more decoding locations along a path of the optical signal in the optical network;

(b) selecting one or more tone frequencies exclusive of the detected noise tone frequencies; and (c) encoding the optical signal with the selected tone frequencies at an encoding location, which is upstream from said one or more decoding locations.

In the embodiment of the invention, the optical signal is an optical wavelength traveling in one or more wavelength division multiplex (WDM) links in the optical network; and the step (a) includes performing a discrete transform operation, e.g. Fast Fourier Transform, to generate a frequency spectrum for each WDM link to detect said noise tone frequencies.

The step (a) comprises combining the spectra of said noise tone frequencies in the form of a noise tone presence table indicating noise tone frequencies detected at any of said decoders. Conveniently, the step of combining comprises forming the noise tone presence table in the form of a bitmap, in which one of the logic "1" or "0" indicates a detected noise tone frequency, and the other logic indicates a frequency available for identifying the optical signal.

In the method described above, the optical signal may originate from outside the optical network, and the detected noise tone frequencies may include tone frequencies originating from outside the optical network. The detected noise tone frequencies may include tone frequencies resulting from payload modulation of the optical signal, and/or tone frequencies resulting from cross gain modulation of the optical signal.

In the embodiment of the invention, the step of combining comprises converting each spectrum of said noise tone frequencies into a bitmap formatted spectrum; transmitting the bitmap formatted spectra to a network manager; processing the bitmap formatted spectra into the noise tone presence table; and sending the noise tone presence table to the encoding location.

Alternatively, the step of combining may comprise converting each spectrum of said noise tone frequencies into a bitmap formatted spectrum; transmitting the bitmap formatted spectra to the encoding location; and processing the bitmap formatted spectra into the noise tone presence table.

Conveniently, the steps of processing comprise performing a logical OR function over the bitmap formatted spectra to generate the noise tone presence table, and the step (a) of detecting further includes applying a threshold to the frequency spectrum to detect said noise tone frequencies.

In order to identify faults at the decoders, the method further comprises the steps of:
  comparing the detected noise tone frequencies at each decoder;
  correlating the results of the comparisons with locations of the decoders; and
  detecting faulty decoders based on the correlating results.

According to yet another aspect of the present invention, there is provided a system for identifying an optical signal in an optical network, comprising:
  a encoder, at an encoding location in the optical network, for inserting an identification tag into the optical signal by modulating the optical signal with at least one tone frequency selected from a range of frequencies;
  one or more decoders, at decoding locations downstream from the encoding location along a path of the optical signal, for detecting the noise tone frequencies along the optical path; and
  a network manager for combining the detected noise tone frequencies from the decoding locations to generate a noise tone information object, and for removing the frequencies indicated in the noise tone information object from the range of frequencies available for selection at the encoding location.

Preferably, the noise tone information object is a noise tone presence table.

Conveniently, the network manager comprises a centralized network-wide software unit. Alternatively, the network manager may comprise a plurality of controllers distributed in the optical network.

According to one more aspect of the invention there is provided a system for selecting tone frequencies for identifying an optical signal in an optical network, comprising:

(a) one or more decoders located at one or more decoding locations in the optical network along a path of the optical signal in the optical network for detecting noise tone frequencies;

(b) a network manager for selecting one or more tone frequencies exclusive of the detected noise tone frequencies; and (c) an encoder at an encoding location that is upstream from said one or more of the decoding locations, for encoding an identification tag of the optical signal with the selected tone frequencies.

In the system described above, the optical signal is an optical wavelength traveling in one or more wavelength multiplex (WDM) links in the optical network, and each decoder includes means for performing a discrete transform operation, e.g. FFT, to generate a frequency spectrum for each WDM link to detect said noise tone frequencies. The decoder also comprises means for applying a threshold to the frequency spectrum to detect said noise tone frequencies.

The network manager comprises means for combining the spectra of said noise tone frequencies in the form of a noise tone presence table indicating the detected noise tone frequencies, wherein the noise tone presence table is a bitmap in which one of the logic "1" or "0" indicates a detected noise tone frequency, and the other logic indicates a frequency available for identifying the optical signal.

In the system described above, the optical signal may originate from outside the optical network, and the detected noise tone frequencies may include tone frequencies originating from outside the optical network. The detected noise tone frequencies may include tone frequencies resulting from payload modulation of the optical signal, and/or tone frequencies resulting from cross gain modulation of the optical signal.

The decoder comprises decoder means for converting each spectrum of said noise tone frequencies into a bitmap formatted spectrum; and a network manager comprises means for processing the bitmap formatted spectra into the noise tone presence table and forwarding the noise tone presence table to the encoder. Alternatively, in a distributed model, an encoder may comprise encoder means for processing the bitmap formatted spectra into the noise tone presence table. Conveniently, the means for processing comprises a logic means for performing a logical OR function over the bitmap formatted spectra to generate the noise tone presence table.

An optical network, employing the system for identifying the optical signal as described above, is also provided.

Thus, an improved system and methods for identifying an optical signal in an optical network and selecting pilot/dither tone frequencies for identifying an optical signal in an optical network have been provided.

BRIEF DESCRIPTION OF THE DRAWINGS

An embodiment of the invention will now be described, by way of example, with reference to the accompanying drawings, in which.

DETAILED DESCRIPTION OF THE EMBODIMENTS OF THE INVENTION

A number of techniques are described in the prior art which improve systems using pilot tones, including the tagging of an optical path elements (channels, fibers, etc.) with multiple pilot (dither) tones, alternating tones, minimum frequency spacing, security credentials, etc.; and their reliable detection using advanced signal processing such as coherent and averaging FFT, dynamic thresholding.

The proposed method and system for tone avoidance of the present invention is compatible with existing methods but improves the network wide selection of dither tone frequencies by taking the presence of detected noise tones into account directly, thus largely avoiding the detrimental effect of noise tones, as described in detail in the following.

Figure 4:
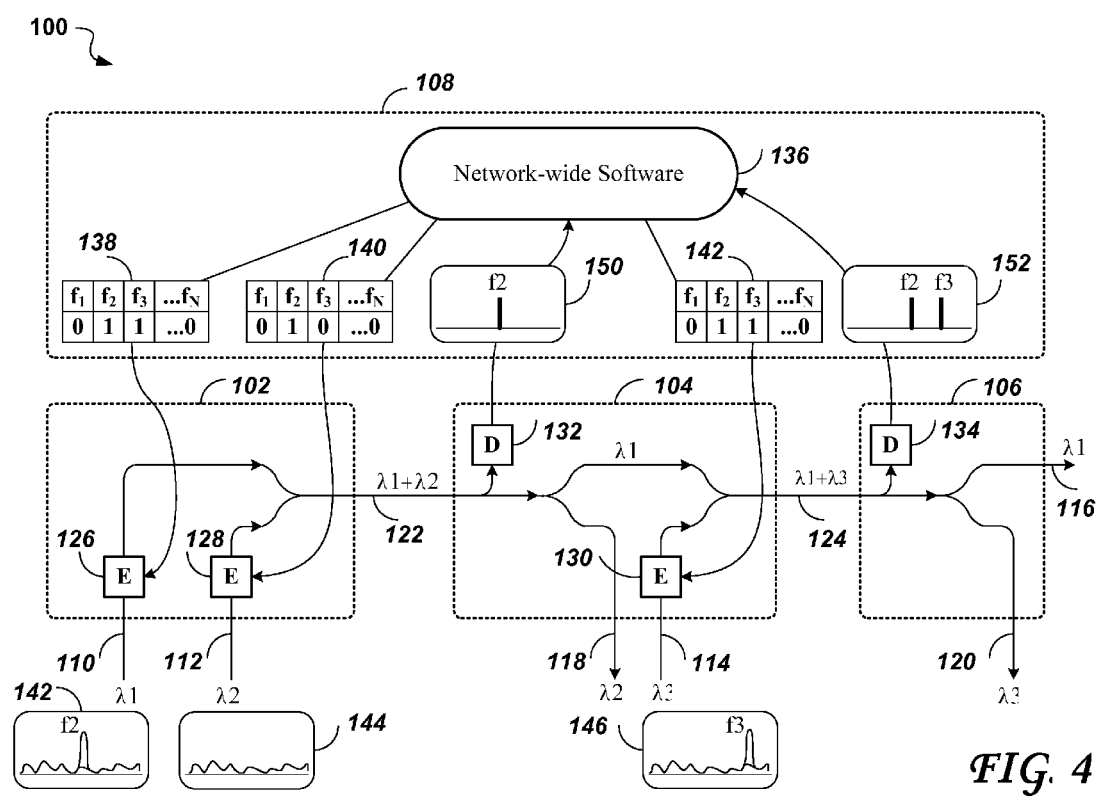
FIG. 4 shows a simple exemplary optical network 100 according to the embodiment of the invention.

FIG. 4 shows a simple exemplary optical network 100 according to an embodiment of the invention. The optical network 100 includes a number of optical network elements: an optical multiplex node 102, an optical add-drop multiplex node (OADM) 104, and an optical demultiplex node 106. The optical network 100 further includes a Network Manager 108.

The Network Manager 108 may be a centralized computer, or alternatively may be implemented in distributed fashion in controllers, comprising computer engines, associated with some or all of the optical network elements.

An aspect of the optical network 100 is the routing of optical connections between external optical network inputs and optical network outputs over optical network paths that extend between optical network elements, and transparently through them. A simple optical path may be defined as the path of an optical signal (typically of a single wavelength $\lambda$), which is carried from a network input to a network output, and tagged with a unique identification tag (a dither or pilot tone of a frequency f). For simplicity, this is the model used in the present description. As shown in the referenced prior art, an identification tag may comprise multiple dither ones, and may also be assigned to a group of wavelengths, a fiber or a fiber bundle.

The optical network 100 includes three external optical inputs 110, 112, and 114; and three external optical outputs 116, 118, and 120. The optical inputs 110 and 112 are connected to inputs of the optical multiplex node 102, and the optical input 114 is connected to an input of the OADM 104. The optical outputs 116 and 120 are outputs of the optical demultiplex node 106 while the optical output 118 is an output of the OADM 104.

The optical multiplex node 102 is connected to the OADM 104 through a multi-wavelength (WDM) link 122, and the OADM 104 is further connected to the optical demultiplex node 106 via another WDM link 124.

The three optical paths provided in the optical network 100, in the configuration shown in FIG. 4, are designated by their wavelength: $\lambda 1$, $\lambda 2$, and $\lambda 3$.

The optical path for $\lambda 1$ extends as follows: from the external optical input 110 through the optical multiplex node 102; through the WDM link 122 (which also carries $\lambda 2$); through the OADM 104; through the WDM link 124 (which also carries $\lambda 3$); through the optical demultiplex node 106; and to the optical output 116.

The optical path for $\lambda 2$ extends as follows: from the external optical input 112 through the optical multiplex node 102; through the WDM link 122 (which also carries $\lambda 1$); through the OADM 104; and to the optical output 118.

The optical path for $\lambda 3$ extends as follows: from the external optical input 114; through the OADM 104; through the WDM link 124 (which also carries $\lambda 1$); through the optical demultiplex node 106; and to the optical output 120.

Associated with each external optical input is an encoder for modulating (tagging) the optical signal with a dither/pilot tone. For convenience, the encoders are shown as parts of the corresponding network elements. The optical signals $\lambda 1$ and $\lambda 2$ are tagged in encoders 126 and 128 respectively, located in the optical multiplex node 102. The optical signal $\lambda 3$ is tagged in an encoder 130 in the optical add-drop multiplex node (OADM) 104.

Associated with each WDM link is a decoder for detecting the presence of tags (dither or pilot tones) in the WDM signal. Each decoder taps a portion of the optical multi-wavelength signal, e.g., 5%, and has corresponding means for performing spectrum analysis including a discrete transform operation, e.g., a Fast Fourier Transform (FFT) to detect the presence of tones which may be pilot tones, but also includes noise tones, as described in the background section. The decoder also comprises means for applying a threshold to the frequency spectrum to detect said noise tone frequencies. For convenience, the decoders are shown as parts of the network elements that terminate the corresponding WDM links. A decoder 132 is connected to a tap on the WDM link 122 (which carries $\lambda 1$ and $\lambda 2$), and a decoder 134 is connected to a tap on the WDM link 124 (which carries $\lambda 1$ and $\lambda 3$).

The decoders (132 and 134) send their results to the Network Manager 108. The Network Manager 108 includes Network-wide Software unit 136, which processes the decoder results, and generates a noise tone information object in the form of a "noise tone presence table" for each encoder, i.e. for each optical signal at the start of its corresponding optical path. Three such tables denoted by reference numerals 138, 140, and 142 are shown in FIG. 4, with arrows pointing to the corresponding encoders 126, 128, and 130 respectively. The Network-wide Software unit 136, with knowledge of the network connectivity, generates the noise tone presence tables 138, 140, and 142. The noise tone presence tables are conveniently stored in the form of a bitmap ("noise tone presence bitmap").

The Network-wide Software unit 136 comprises a logic means (not shown) and provides the intelligence for processing the detected spectra (or their bitmap equivalents) and creating the noise tone information object (in the form of the noise tone presence tables) for each encoder. Alternatively, this task could be carried out by passing the noise tone information, i.e. the results from each decoder in the form of a spectrum or, more efficiently, as a bitmap, directly between all nodes so that each node is aware of the entire set of noise tone presence tables and has corresponding controller (not shown) having the intelligence to decide which tones to use or avoid in the encoders of that node. Distributing this information from each decoding node to all encoding nodes would avoid using a network wide tool (the Network Manager 108) to provision tones. In effect, a distributed software system including controllers that have network topology information could replace the single Network Manager 108.

Thus, the decoder comprises decoder means for converting each spectrum of said noise tone frequencies into a bitmap formatted spectrum; and either a network manager 108 comprises means for processing the bitmap formatted spectra into the noise tone presence table and forwarding the noise tone presence table to the encoder, or alternatively, an encoder may comprise corresponding encoder means for processing the bitmap formatted spectra into the noise tone presence table, including respective logic means for performing a logical OR function over the bitmap formatted spectra to generate the noise tone presence table.

While the Network Manager 108 may have a number of other functions, already described in the included prior art, such as managing the network based on the setting and detecting of identification tags (one or more dither tones or pilot tones), it is the method by which the tone frequencies are selected, and interference by noise tones is avoided, as described in the embodiment of the present invention.

Each noise tone presence table 138 to 140 includes a bitmap of "0" and "1", indexed by frequency, i.e. $f_1$, $f_2$, $f_3$, to $f_N$, where the range of frequencies $f_1$ to $f_N$ includes all frequencies that are considered for use in pilot/dither tones for the optical network 100. The bitmap then indicates which frequencies may actually be used by the particular encoder for which the noise tone presence table is generated, for example the table 138 that is generated for the encoder 126 for the optical signal λ1, taking into account the noise tones that are detected in the network along the optical path of λ1.

In FIG. 4, an example is illustrated in which it is assumed that the optical path λ1 carries a noise tone at a frequency f2 as shown in a spectrum image 142; the optical path λ2 carries no noise tone above the background noise as shown in a spectrum image 144; the optical path λ1 carries a noise tone at a frequency f3 as shown in a spectrum image 146.

In the present example network configuration, the optical path for λ1 extends from the input 110 to the output 116, and shares the WDM links 122 and 124 with the optical paths λ2 and λ3 respectively. The spectrum detected by the decoder 132 monitoring the WDM link 122 includes the noise tone at the frequency f2, as illustrated in a thresholded spectrum diagram 150 in which the background noise has been suppressed.

The spectrum detected by the decoder 134 monitoring the WDM link 124 includes the noise tone at the frequency f2 (from the optical path λ1), as well as the noise tone at the frequency f3 (from the optical path λ3). This is illustrated in a spectrum diagram 152 in which the background noise has been suppressed. The spectra (150, 152) may be readily converted into a bitmap format (not shown explicitly) that is the same as the format of the "noise tone presence table" as follows: for each of the frequencies f1 to $f_N$, a threshold is applied, and a noise tone is considered to be present (logic "1") at the respective frequency if the spectrum amplitude at that frequency exceeds the threshold.

Both decoders (132 and 134) are located downstream from the encoder 126 along the optical path λ1, and are thus placed to detect any noise tone frequencies that could interfere with the (yet to be decided) identification tone frequencies for λ1, including: noise tone frequencies already present at the external input 110 for example caused by the payload; noise tone frequencies introduced by other optical signal that share WDM links; noise tone frequencies generated by cross gain modulation in optical amplifiers (not shown); and frequencies already present in identification tags such as the noise tone f2 (spectrum 142) which could be a pilot tone sent by an external network. By identifying the noise tones frequencies from the decoders that are located along each optical path in the network, downstream from the encoder, the encoder is able to avoid selecting any of those tones in the identification tag of the optical path.

With the information obtained from the decoders 132 and 134, the Network-wide Software 136 generates the noise tone presence table 138, in which it is indicated (by a "1" bit entry) that the frequencies f2 and f3 are not available to be allocated in the pilot tones of the optical path λ1 in the encoder 126 because noise tones of f2 and f3 have been detected along the path (e.g., in WDM links used by) of the optical path λ1, in the downstream decoders 132 and 134. The frequency f1 remains available ("0" no noise detected at this frequency). In effect, the noise tone presence table 138 may be generated efficiently by a bit-wise logical OR-function of the spectra 150 and 152 after they have been converted to the bitmap format.

As indicated in the noise tone presence table 138, the frequencies f2 and f3 should not be used in λ1 because of interference by the noise tones f2 (within λ1 itself) and f3 (from λ3 that is sharing the WDM link 124 with λ1).

We turn now to the case of the optical path λ2 in the present example network configuration.

The optical path λ2 extends from the input 112 to the output 118, and shares only the WDM link 122 with the optical path λ1. The spectrum detected by the decoder 132 monitoring the WDM link 122 includes only the noise tone at the frequency f2 as shown in the spectrum diagram 150.

With the information obtained from the decoder 132, the Network-wide Software 136 generates the noise tone presence table 140, in which it is indicated (by a "1" bit entry) that the frequency f2 should not be allocated in the pilot tones of the optical path λ2 in the encoder 128, because of the presence of noise at that frequency. The frequencies f1 and f3 remain available, which is indicated by a "0" bit entry that no noise is detected.

As indicated in the noise tone presence table 140, only the frequency f2 should be avoided in the pilot tones of the optical path λ2 because of interference by the noise tone f2 (from λ1 that is sharing the WDM link 122 with λ1). The frequency f3 is free to be used, because the source of the noise tone at f3, i.e. the optical path λ3, does not share a WDM link with λ2.

The optical path λ3 extends from the input 114 to the output 120, and shares the WDM link 124 with the optical path λ1. The spectrum detected by the decoder 134 monitoring the WDM link 124 includes the noise tone at the frequency f2 (from the optical path λ1), as well as the noise tone at the frequency f3 (from the optical path λ3), as illustrated in the spectrum diagram 152.

Thus, with the information obtained from the decoder 134, the Network-wide Software 136 generates the noise tone presence table 142, in which it is indicated by a "1" bit entry that the frequencies f2 and f3 should not be allocated in the pilot tones of the optical path λ3 in the encoder 130, because of the presence of noise at those frequencies. The frequency f1 remains available as indicated by bit entry "1".

As indicated in the noise tone presence table 138, the frequencies f2 and f3 should not be used, because of interference by the noise tones f3 (within λ3 itself) and f2 (from λ1 that is sharing the WDM link 124 with λ3).

Which frequencies from the range $f_1$ to $f_N$ are actually allocated to the three optical paths λ1 to λ3 may be further determined based on other criteria as described in the cited prior art, but, according to the present invention, can advantageously take into account the information about noise tones that is provided in the individual noise tone presence tables 138 to 142, thus avoiding frequencies indicated as "noise" tones with respect to each optical path.

Although the optical network 100 of FIG. 4 is a very small simplified network presented for illustration purposes only, it is understood that the invention is equally applicable to much larger networks, including networks with components such as switches, optical amplifiers, and other components not illustrated in FIG. 4 for the sake of clarity. Furthermore, the illustration of the optical network elements has been simplified in order to indicate their functionality and should not be taken to limit the implementation of such elements as other implementations fall equally within the scope of the invention.

Figure 5:
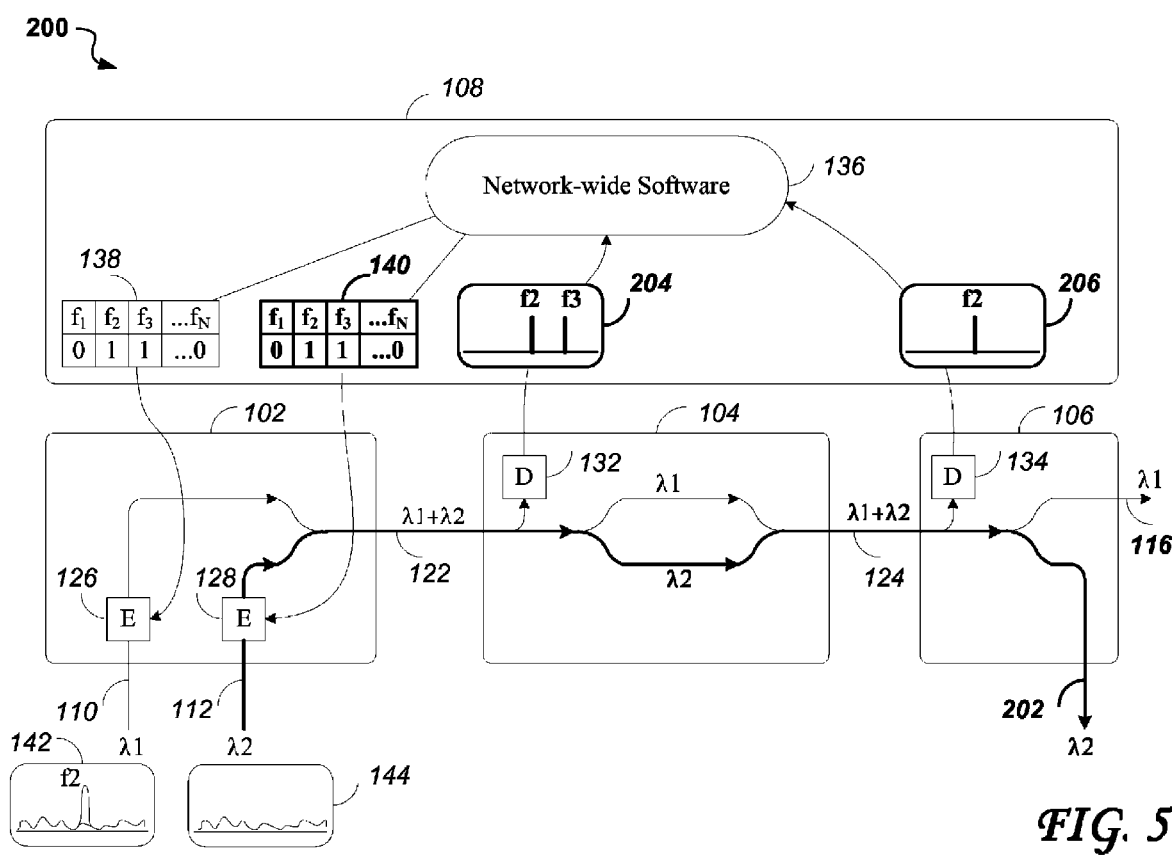
FIG. 5 shows a modified optical network 200 illustrating another example of noise tone avoidance according to the embodiment of the invention.

FIG. 5 shows a modified optical network 200 to illustrate another example of noise tone avoidance.

The modified optical network 200 is similar to the optical network 100 of FIG. 4, except for being configured differently. To indicate the changes in the drawing, unchanged elements are tagged with the same reference numerals in FIG. 5 as the corresponding elements in FIG. 4. Changes are indicated in bolded text and thicker lines, namely:

the optical path λ3 is omitted;

the optical path λ2 now extends from the external optical input 112 in the optical multiplex node 102; over the WDM link 122; through the OADM 104; over the WDM link 124; and to an external optical output 202 in the demultiplexer 106;

a different spectrum 204 (showing f2 and f3) is obtained by the decoder 132;

a different spectrum 206 (showing only f2) is obtained by the decoder 134; and the noise tone presence table 140 contains different information, specifically the frequency f3 has become unavailable for the encoder 128 because of the presence of noise ("1").

In the example of the modified optical network 200, the decoder 134 detects the noise tone at the frequency f2 and the decoder 132 detects noise tones at the frequencies f2 and f3.

Because both decoders 132 and 134 "see" the noise tone at the frequency f2 in the WDM links 122 and 124, this tone is detected in both decoders. The detection of the frequency f3 in the decoder 132 as shown in the spectrum 204 is somewhat surprising because the spectra of neither λ1 (the spectrum 142) nor λ2 (the spectrum 144) appear to exhibit a noise tone at the frequency f3; hence the spectra detected by the decoders 132 and 134 would be expected to be identical.

The difference in detection results could be due to various reasons, for example:

the tone f3 is generated in the electronic circuitry of the decoder 132;

the tone f3 is actually carried by either λ1 and/or λ2, but the signal level of the tone f3 at the decoder 132 is large enough for detection, but not large enough at the decoder 134;

the tone f3 is carried by another wavelength (not shown in the FIG. 5), but the signal level of the tone f3 at the decoder 132 is large enough for detection, but not large enough at the decoder 134; or the tone f3, even though not present at the decoder 132, is incorrectly detected by it, for example due to faulty hardware.

The use of multiple decoders along an optical path not only provides a certain degree of robustness to the noise tone detection, it can also serve as a diagnostic tool when the results from the decoders are correlated with each other and with the topology of the network, and discrepancies point to potential faults.

Whatever the reason, the decoder 132 detects and reports the noise tones f2 and f3 as present, and the decoder 134 reports only the noise tone f2 as present. The Network-wide Software 136 will nevertheless derive the noise tone presence table 140 with the frequencies f2 and f3 as unavailable for the λ2 encoder 128 due to detected noise at those frequencies.

The situation for the optical path λ1 remains unchanged vis-à-vis FIG. 4, and both the frequencies f2 and f3 remain unavailable for the encoder 126 of λ1.

The individual noise tone presence tables for each optical path may be stored in the Network Manager 108, and the Network-wide Software 136 may inform each encoder, e.g. 126, 128, et al., which tones may be used for encoding the optical channel, e.g. λ1, λ2, et al.,) where the channel first enters the network, e.g. the external optical inputs 110, 112, et al.

The Network-wide Software 136 may receive updated detection results periodically, or as a result of adding or activating optical paths to the network. Whenever the detection result of noise tones change, the noise tone presence tables of the affected encoders are updated and their tones are changed accordingly.

In an optical network, the total number of optical channels (wavelengths) on each network WDM link may be up to 100 or more. The sub-modulation depth of dither tones is usually very small, typically about 4 percent. Even though a single tone has been illustrated as a channel identifier, it is understood that a combination of tones may be also used as a channel identifier.

Figure 1:
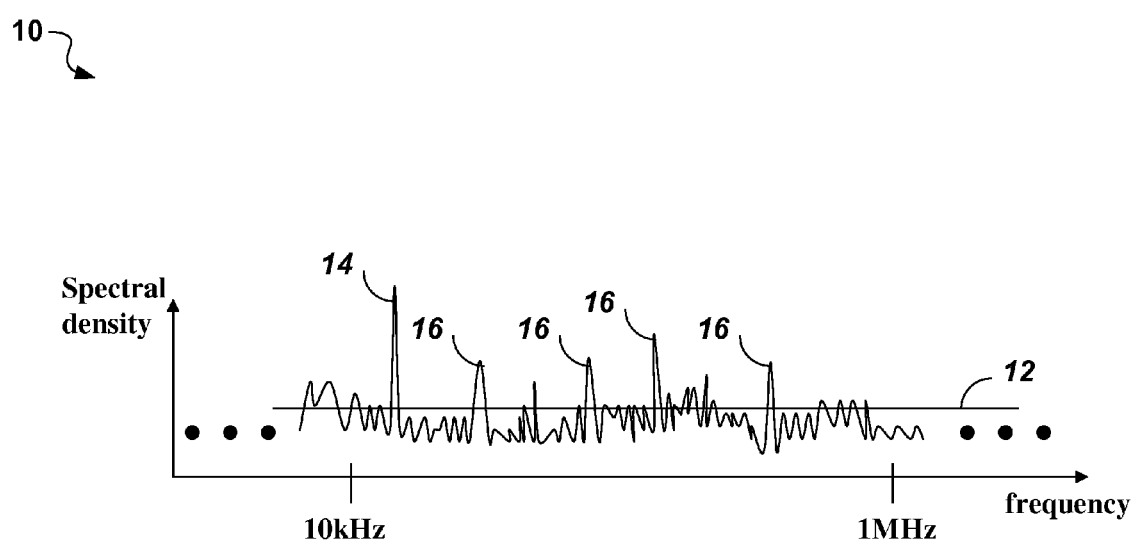
FIG. 1 illustrates a typical payload data spectrum 10.
Figure 2:
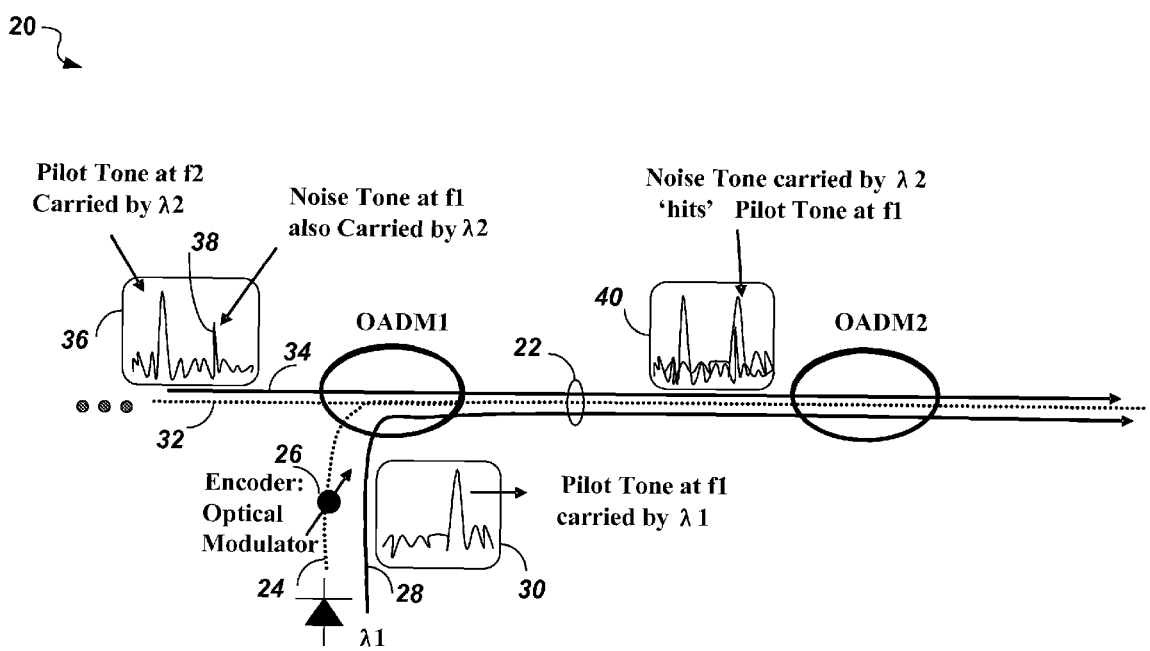
FIG. 2 illustrates a scenario 20 of a section of an optical network of the prior art.
Figure 3:
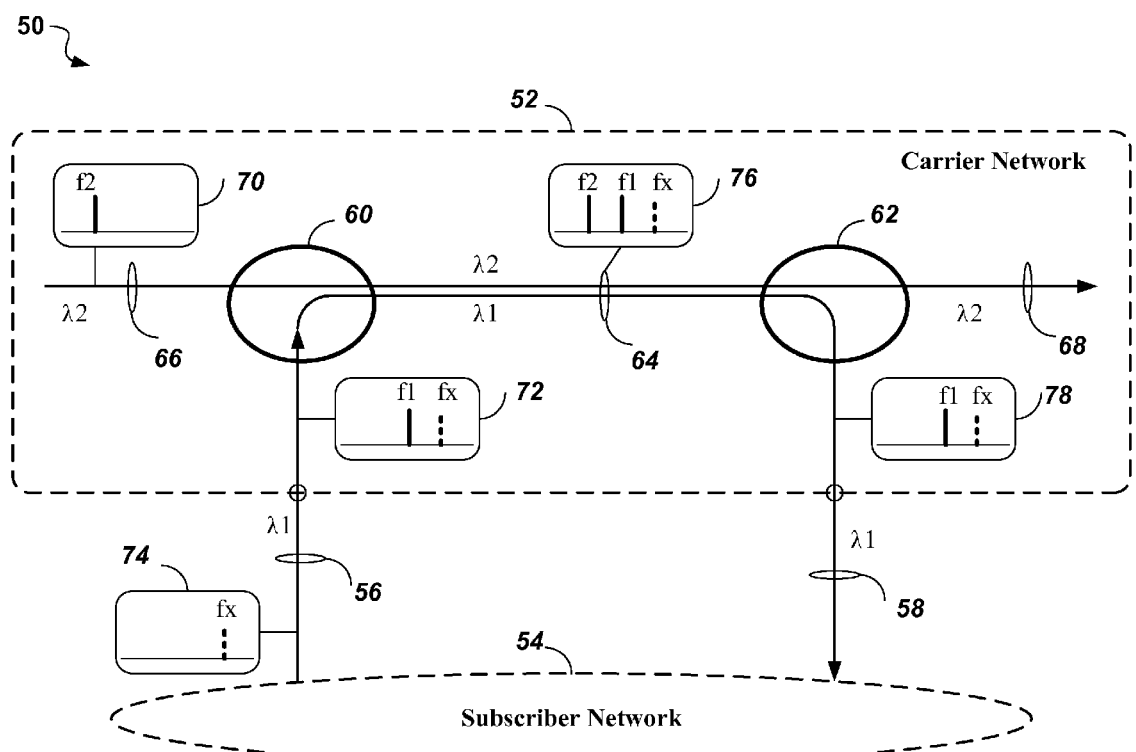
FIG. 3 shows an example of a network hierarchy 50 of the prior art.

The introduction of the noise tone presence tables allows the frequencies of the detected noise tones to be avoided in dither tone allocations, regardless of whether single dither tone or a combination of dither tones are used as channel identifiers. Furthermore, the noise tone presence tables will also catch externally introduced tone frequencies such as described with regards to FIG. 3, in which case the carrier network 52 of FIG. 3 may be enhanced to automatically provide compatibility without risk of overlapping dither tone frequency assignments.

It should also be pointed out that, while noise tone detection may be done network wide, each individual optical channel, i.e. it's frequency allocation of pilot/dither tones, may be protected independently, and only those frequencies need to be avoided that are actually present along its respective optical path.

Although the embodiment of the invention has been described in detail, it will be apparent to one skilled in the art that variations and modifications to the embodiment may be made within the scope of the following claims.

What is claimed is:

1. A method for identifying an optical signal in an optical network, comprising:

detecting noise tone frequencies within a range of frequencies downstream from an encoding location along a path of the optical signal in the optical network;

detecting pilot tones modulated onto the optical signal downstream from the encoding location along the path of the optical signal in the optical network;

combining the detected noise tone frequencies and the detected pilot tones into a list of frequencies in said range of frequencies;

at the encoding location, selecting at least one tone frequency exclusive of the detected noise tone frequencies and pilot tones from the list of frequencies;

modulating an optical signal at the encoding location with said at least one tone frequency for identifying the optical signal in the optical network;

comparing the noise tone frequencies and the pilot tones detected along the path;

correlating results of the comparisons with decoding locations along the path where the noise tone frequencies and the pilot tones have been detected; and detecting faulty decoding locations based on the correlating results.

2. The method of claim 1, wherein the combining comprises generating a noise tone information object in a form of noise tone presence table.

3. The method of claim 1, wherein the detecting noise tone frequencies comprises:

monitoring a frequency spectrum within the range of frequencies, comprising performing a spectrum analysis operation including a discrete transform operation;

determining noise tone frequencies whose amplitude is above a predetermined threshold level; and forwarding a list of the noise tone frequencies to a network manager for processing.

4. The method of claim 3, wherein the performing comprises performing a Fast Fourier Transform (FFT) operation.

5. The method of claim 3, wherein the monitoring comprises monitoring the frequency spectrum periodically.

6. The method of claim 1, wherein the selecting comprises selecting the range of frequencies from about 10 kHz to about 1 MHz.

7. A method for selecting tone frequencies from a range of frequencies for identifying an optical signal in an optical network, the method comprising:

(a) detecting noise tone frequencies at one or more decoding locations along a path of the optical signal in the optical network;

(b) detecting pilot tones modulated onto the optical signal at said decoding locations;

(c) forming a list of frequencies in said range of frequencies by combining the detected noise tone frequencies and the detected pilot tones;

(d) selecting one or more tone frequencies exclusive of the detected noise tone frequencies and pilot tones from the list of frequencies; and (e) encoding the optical signal with the selected one or more tone frequencies at an encoding location, which is upstream from said one or more decoding locations;

wherein the optical signal is an optical wavelength traveling in one or more wavelength division multiplex (WDM) links in the optical network;

wherein the step (a) includes performing a discrete transform operation to generate a frequency spectrum for each WDM link to detect said noise tone frequencies and said pilot tones;

wherein the step (c) comprises combining spectra of said noise tone frequencies and said pilot tones in a form of a noise tone presence table indicating detected noise tone frequencies; and wherein the combining comprises forming the noise tone presence table in a form of a bitmap, in which one of the logic "1" or "0" indicates a detected noise tone frequency, and the other logic indicates a frequency available for identifying the optical signal.

8. The method as described in claim 7, wherein the optical signal originates from an external optical network, and wherein the detected noise tone frequencies include tone frequencies sent by the external optical network.

9. The method as described in claim 7, wherein the detected noise tone frequencies include tone frequencies resulting from payload modulation of the optical signal.

10. The method as described in claim 7, wherein the detected noise tone frequencies include tone frequencies resulting from cross gain modulation of the optical signal.

11. The method as described in claim 7, wherein the combining further comprises sending the noise tone presence table to the encoding location.

12. The method as described in claim 7, wherein the processing comprises performing a logical OR function over the bitmap formatted spectra to generate the noise tone presence table.

13. The method as described in claim 7, wherein the step (a) further includes applying a threshold to the frequency spectrum to detect said noise tone frequencies and said pilot tones.

14. The method as described in claim 7, further comprising:

comparing the detected noise tone frequencies and said pilot tones at each decoding location;

correlating results of the comparisons with locations of the decoding locations; and detecting faulty decoding locations based on the correlating results.

15. A system for identifying an optical signal in an optical network, comprising:

a encoder, at an encoding location in the optical network, modulating the optical signal with at least one tone frequency selected from a range of frequencies for identifying the optical signal in the optical network;

one or more decoders, at decoding locations downstream from the encoding location along a path of the optical signal, for detecting noise tone frequencies and pilot tones modulated onto the optical signal along the optical path; and a network manager for combining the detected noise tone frequencies and pilot tones from the decoding locations to generate a list of frequencies in said range of frequencies at the encoding location, and selecting the at least one tone frequency exclusive from the list of frequencies for modulating the optical signal at the encoding location;

wherein the network manager is configured to:

compare the noise tone frequencies and the pilot tones detected along the path;

correlate results of the comparisons with decoding locations along the path where the noise tone frequencies and the pilot tones have been detected; and detect faulty decoding locations based on the correlation results.

16. The system of claim 15, wherein the list of frequencies is generated from a noise tone presence table.

17. The system of claim 15, wherein the network manager comprises a centralized network-wide software unit, comprising computer readable instructions stored in the computer readable medium for execution by a processor.

18. The system of claim 15, wherein the network manager comprises a plurality of controllers distributed in the optical network.

19. A system for identifying an optical signal in an optical network, comprising:

(a) one or more decoders located at one or more decoding locations in the optical network along a path of the optical signal in the optical network for detecting noise tone frequencies and pilot tones modulated onto the optical signal along the path;

(b) a network manager for selecting one or more tone frequencies exclusive of the detected noise tone frequencies and pilot tones; and (c) an encoder at an encoding location upstream from said one or more of the decoding locations, for encoding the optical signal with the selected one or more tone frequencies for identifying the optical signal in the optical network;

wherein the optical signal is an optical wavelength traveling in one or more wavelength multiplex (WDM) links in the optical network, and wherein each decoding location includes means for performing a discrete transform operation to generate a frequency spectrum for each WDM link to detect said noise tone frequencies and pilot tones;

wherein the network manager comprises means for combining spectra of said noise tone frequencies and pilot tones in a form of a noise tone presence table indicating the detected noise tone frequencies and pilot tones; and wherein the noise tone presence table is a bitmap in which one of the logic "1" or "0" indicates a detected noise tone frequency and pilot tones, and the other logic indicates a frequency available for identifying the optical signal.

20. The system as described in claim 19, wherein the optical signal originates from an external optical network, and wherein the detected noise tone frequencies include tone frequencies sent by the external optical network.

21. The system as described in claim 19, wherein the detected noise tone frequencies include tone frequencies resulting from payload modulation of the optical signal.

22. The system as described in claim 19, wherein the detected noise tone frequencies include tone frequencies resulting from cross gain modulation of the optical signal.

23. The system as described in claim 19, wherein:
the decoding location comprises decoder means for converting each spectrum of said noise tone frequencies and pilot tones into a bitmap formatted spectrum; and
the network manager comprises means for processing the bitmap formatted spectra into the noise tone presence table, and forwarding the noise tone presence table to the encoder.

24. The system as described in claim 19, wherein:
the decoding location comprises decoder means for converting each spectrum of said noise tone frequencies into a bitmap formatted spectrum; and
the encoding location comprises encoder means for processing the bitmap formatted spectra into the noise tone presence table.

25. The system as described in claim 23, wherein the means for processing comprises a logic means for performing a logical OR function over the bitmap formatted spectra to generate the noise tone presence table.

26. The system as described in claim 24, wherein the encoder means comprises a logic means for performing a logical OR function over the bitmap formatted spectra to generate the noise tone presence table.

27. The system as described in claim 19, wherein the decoding location further comprises means for applying a threshold to the frequency spectrum to detect said noise tone frequencies and pilot tones.

28. The method of claim 1, wherein the step (c) comprises combining spectra of said noise tone frequencies and said pilot tones in a form of a noise tone presence table indicating detected noise tone frequencies.

29. The method as described in claim 28, wherein the combining comprises:
converting each spectrum of said noise tone frequencies and said pilot tones into a bitmap formatted spectrum;
transmitting the bitmap formatted spectra to a network manager; and
processing the bitmap formatted spectra into the noise tone presence table.

30. The method as described in claim 29, wherein the processing comprises performing a logical inversion function over the noise tone presence table to generate said list of frequencies in said range of frequencies.

* * * * *